Oct. 3, 1967 — W. A. MITCHELL — 3,344,819
TABLE SAW
Filed Oct. 20, 1965 — 4 Sheets-Sheet 1

INVENTOR.
William A. Mitchell

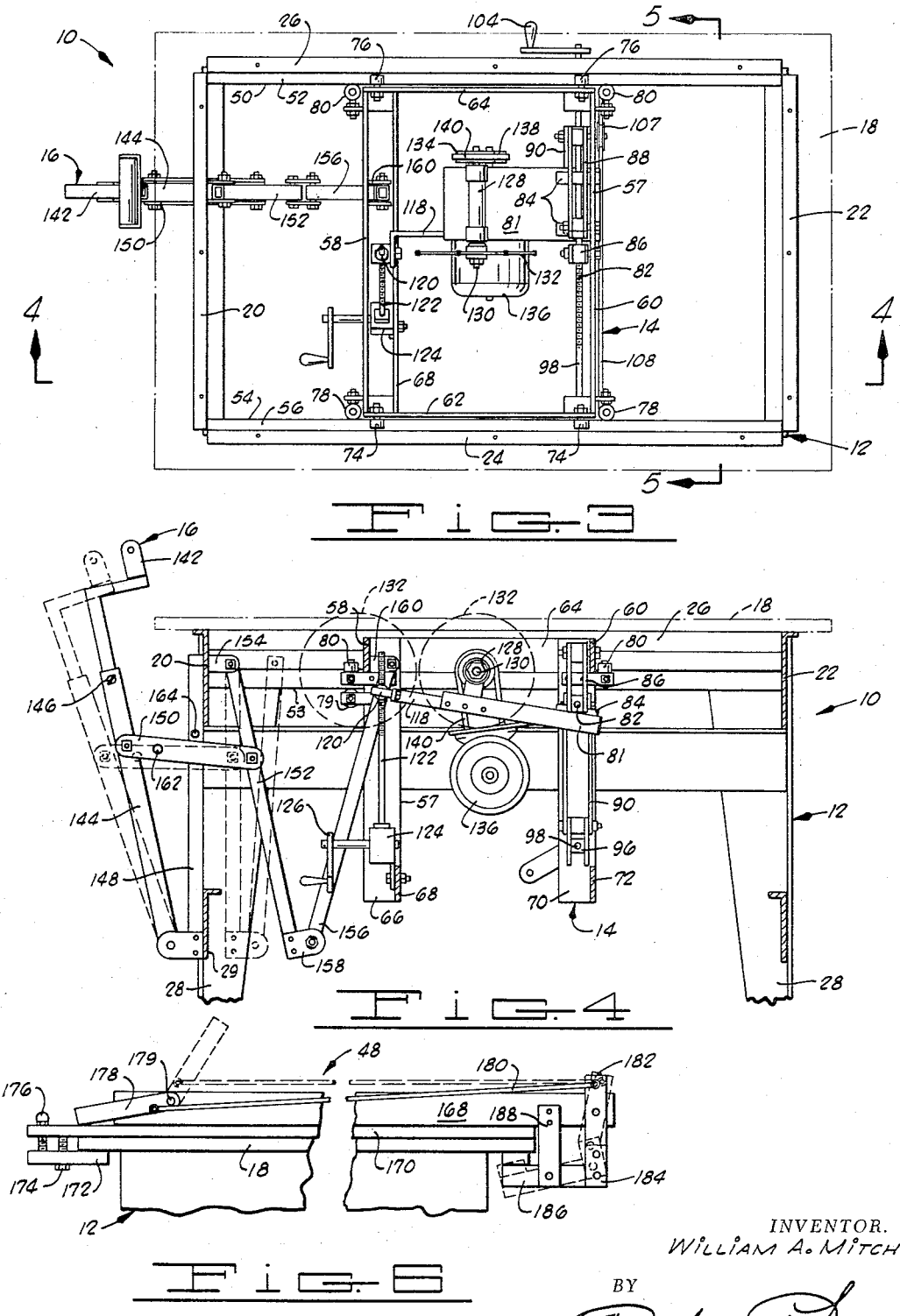

Oct. 3, 1967 — W. A. MITCHELL — 3,344,819
TABLE SAW
Filed Oct. 20, 1965 — 4 Sheets-Sheet 3

INVENTOR.
WILLIAM A. MITCHELL
BY
Dunlap and Laney
ATTORNEYS

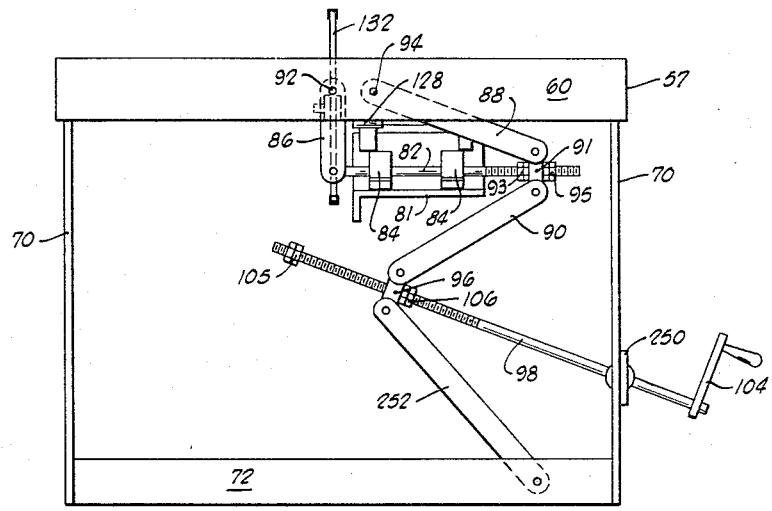
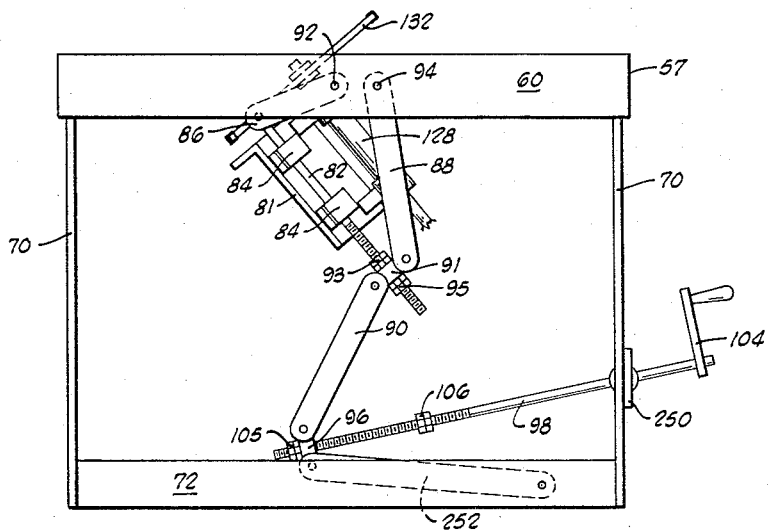

United States Patent Office 3,344,819
Patented Oct. 3, 1967

3,344,819
TABLE SAW
William A. Mitchell, Fort Worth, Tex., assignor to
Donald H. Benson, Oklahoma City, Okla.
Filed Oct. 20, 1965, Ser. No. 498,794
11 Claims. (Cl. 143—36)

This invention relates generally to improved table saws. More particularly, but not by way of limitation, this invention relates to an improved table saw wherein the saw is reciprocated relative to the table.

Generally, this invention contemplates an improved table saw comprising a table including a horizontally disposed top member having an elongated slot therein, a pair of end members below and connected with the top member, and a pair of side members connected with the top and with each of the end members, the side members each having an elongated inwardly facing guide surface and an upwardly facing guide surface thereon; a reciprocating carriage including a frame, a first set of roller members mounted on the frame for rotation about vertical axes and engaging the inwardly facing guide surfaces on the side members, a second set of roller members mounted on the frame for rotation about horizontal axes and engaging the upwardly facing guide surfaces on the side members, the roller members and guide surfaces cooperating to mount the carriage for reciprocating movement in the table, a support member pivotally connected with the frame, a cutter member rotatably mounted on the support member and having a portion thereof disposed in the slot, driving means mounted on the support member and operably connected with the cutter member, adjusting means mounted on the frame and connected with the support member to pivot the support member relative to the frame; and, reciprocating means including an elongated guide member having an upper end connected with one of the end members, a first lever having a lower end pivotally connected with the lower end of the guide member, a second lever having an upper end pivotally connected with the end member, a link having one end pivotally connected with the medial portion of the first lever and the other end pivotally connected with the medial portion of the second lever, and, a third lever having an upper end pivotally connected with the frame and a lower end pivotally connected with the second lever, whereby pivotal movement of the first lever causes an amplified pivotal movement of the third lever to reciprocate the carriage in the table a greater distance than the movement of the first lever.

One object of the invention is to provide an improved table saw that accurately performs the desired cutting operation.

Another object of the invention is to provide an improved table saw that is safe to operate during the cutting operation.

Still another object of the invention is to provide a table saw that may be economically manufactured.

The foregoing and additional objects and advantages of the invention will become more apparent as the following description is read in conjunction with the accompanying drawings wherein like reference characters denote like parts in all views and wherein:

FIG. 3 is a top plan view of the table saw of FIG. 1 with the top removed;

FIG. 4 is a vertical cross-sectional view of the table saw of FIG. 1 taken substantially along the line 4—4 of FIG. 3;

FIG. 9 is a schematic view showing the operation of the tilting mechanism utilized in the table saw of FIG. 1;

FIG. 10 is an enlarged, fragmentary view illustrating an alternative arrangement of tilting mechanism for use in the table saw of FIG. 1; and FIG. 11 is a view similar to FIG. 10, but showing the alternative tilting arrangement in a different operating position.

Figures 1, 2:
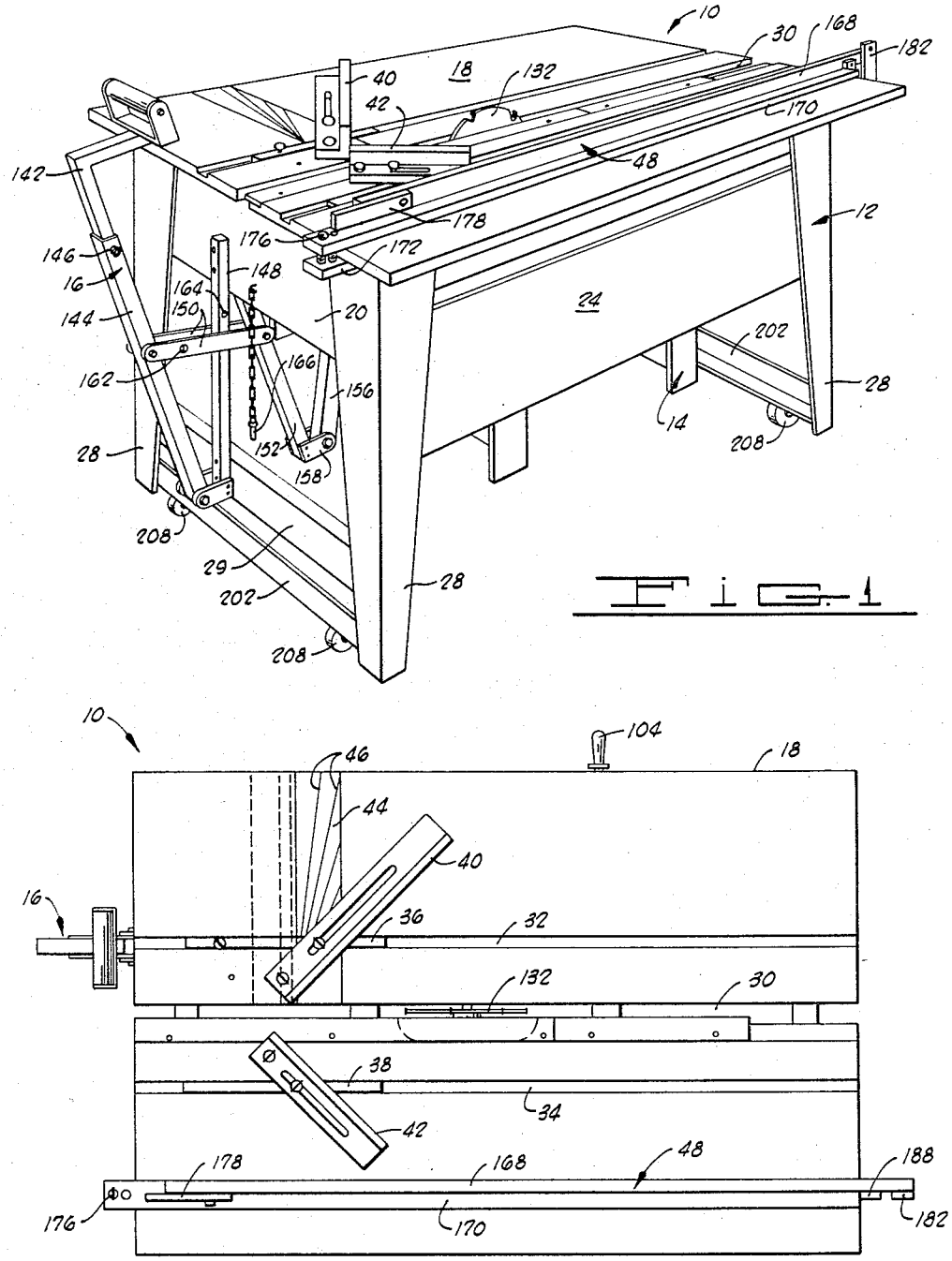
FIG. 1 is a pictorial view illustrating a table saw constructed in accordance with the invention.
FIG. 2 is a top plan view of the table saw of FIG. 1.

Referring to the drawings and to FIG. 1 in particular, shown therein and generally designated by the reference character 10, is a table saw constructed in accordance with the invention. As shown therein, the table saw 10 includes a table 12, a reciprocating carriage 14, and a reciprocating mechanism 16.

The table 12 includes a top 18, an end member 20 that is connected to the top 18, an end member 22 (see FIG. 3) that is also connected with the top 18 in spaced, parallel relation to the end member 20, a side member 24 that is connected with the top 18, and a side member 26 (see FIG. 3) that is also connected with the top 18 and is disposed in parallel spaced relation to the side member 24. As may be seen most clearly in FIG. 3, the end members 20 and 22 have their respective ends joined with the side members 24 and 26.

Downwardly extending legs 28 are disposed at each of the junctures between the end portions 20 and 22 of the side members 24 and 26. A pair of cross members 29 extend between lower portions of the legs 28 relatively below the end members 20 and 22.

As shown most clearly in FIG. 2, the top 18 has a slot 30 therethrough that extends the entire length of the top 18. In addition to the slot 30, the top 18 also includes a pair of parallel recesses 32 and 34 constructed to receive clamping members 36 and 38, respectively. The clamping members 36 and 38 are provided to hold a pair of mitre gauges 40 and 42, respectively, on the surface of the top 18.

The mitre gauges 40 and 42 are adjustable so that a work piece resting thereagainst can be cut at various angles. To aid in positioning the mitre gauge 40 a protractor type device 44 is located in the top 18 and includes a plurality of angularly disposed lines 46.

A guide member or fence 48 is clamped to the table top 18. The structure of the fence 48 will be described more fully in connection with the description of FIG. 6.

Figure 5:
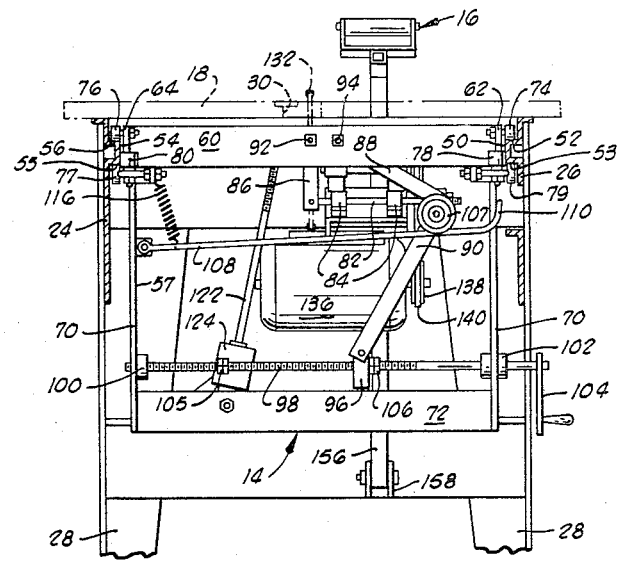
FIG. 5 is a vertical cross-sectional view of the table saw of FIG. 1 taken substantially along the line 5—5 of FIG. 3.

As may be seen in FIGS. 3 and 5, the side member 26 includes an inwardly facing guide surface 50, an upwardly facing guide surface 52, and a downwardly facing guide surface 53. Similarly, the side member 24 includes an inwardly facing guide surface 54, an upwardly facing guide surface 56, and a downwardly facing guide surface 55. The inwardly facing guide surfaces 50 and 54 are arranged in parallel spaced relationship and the upwardly facing guide surfaces 52 and 56 are equi-distant from the surface of the table top 18.

FIGS. 3, 4 and 5 also illustrate in more detail the structure of the carriage 14. As shown in FIG. 3, the carriage 14 includes a frame 57 having an end member 58 disposed relatively adjacent and in spaced parallel relationship with the end member 20 of the table 12. An end member 60 on the frame 57 is held in parallel spaced relationship with the end member 58 by a pair of side members 62 and 64.

A pair of members 66 (only one is shown in FIG. 4) extend downwardly from the intersection of the end member 58 with the side members 62 and 64. A cross-member 68 extends between the members 66 at the lower ends thereof. Similarly, a pair of members 70 extend downwardly from the intersection of the end member 60 with the side members 62 and 64. A cross member 72 extends between the members 70 near the lower ends thereof.

As may be seen most clearly in FIG. 3, the side member 62 is provided with a pair of rollers 74 that are arranged to rotate about horizontally disposed axes. The rollers 74 are in engagement with the upwardly facing guide surface 56 on the side member 24. A pair of roller members 76 are mounted in the side member 64 for rotation about horizontal axes and are in engagement with the upwardly facing guide surface 52 on the side member 26.

As shown in FIGS. 4 and 5, a guide roller 77 rotatably mounted on the frame 57 adjacent the end member 58 is in engagement with the downwardly facing guide surface 55. Similarly, a guide roller 79 is in engagement with the downwardly facing guide surface 53 on the side member 26.

A pair of rollers 78 are carried by the frame 57 adjacent each end of the side member 62 and are mounted for rotation about vertical axes. The rollers 78 are in engagement with the inwardly facing guide surface 54 on the side member 24. Similarly, a pair of rollers 80 are carried by the frame 57 adjacent each end of the side member 64 and are mounted therein for rotation about vertical axes. The rollers 80 are in engagement with the inwardly facing guide surface 50 of the side member 26 of the table 12.

It can be perceived from the foregoing that the rollers 74, 76, 77, 78, 79 and 80 are arranged to support the frame 57 for reciprocating movement in the table 12. The rollers 74 and 76 support the frame against movement downwardly. The weight of the carriage 14 is sufficient to prevent the carriage 14 from moving upwardly away from the upwardly facing guide surfaces 52 and 56. However, to insure that the front end, that is, the end of the carriage 14 containing the end member 58, does not rise during reciprocation of the carriage 14, the rollers 77 and 79 are in engagement with the downwardly facing guide surfaces 55 and 53, respectively. The rollers 78 and 80 support the carriage 14 to prevent movement of the carriage 14 in a horizontal direction other than in the desired direction of reciprocation, that is, in a direction parallel to the slot 30.

The carriage 14 also includes a support member 81. A partially threaded shaft 82 is pivotally connected to the support member 81 by a pair of pillow block bearings 84 mounted thereon. As may be most clearly seen in FIG. 5, one end of the shaft 82 is pivotally connected with a tilting link 86. The opposite end of the shaft 82 is pivotally connected with a second tilting link 88 and with a third tilting link 90 by a short link 91 as shown in FIG. 9. The short link 91 is adjustably positioned of the shaft 82 by a pair of lock nuts 93 and 95. The opposite ends of the tilting links 86 and 88 are pivotally connected at 92 and 94, respectively, with the end member 60 of the frame 57.

The opposite end of the tilting link 90 is pivotally connected with a nut 96 that threadedly engages a tilt actuating shaft 98. As may be seen in FIG. 5, the shaft 98 is threaded and has one end journaled in a bearing 100 located in one of the members 70 and the other end portion journaled in a bearing 102 located in the opposite member 70. The shaft 98 extends through the bearing 102 and has a handle 104 connected therewith for rotating the shaft 98. Stop nuts 105 and 106 located on the shaft 98 are provided to limit the travel of the threaded nut 96 on the shaft 98.

A roller member 107 is rotatably mounted on the tilting link 91 adjacent the connection thereof with the shaft 82. A tilt indicating arm 108 is pivotally connected with the members 70 and extends across the frame 57. An upwardly disposed end portion 110 on the arm 108 is disposed adjacent the opposite member 70.

Figure 5A:
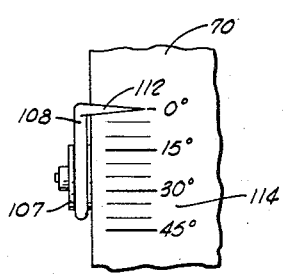
FIG. 5A is an enlarged, fragmentary view showing in more detail the construction of the tilt indicating mechanism utilized in the table saw of FIG. 1.

As may be seen most clearly in FIG. 5A, a pointer 112 extends from the end portion 110 of the indicator arm 108 into juxtaposition with the surface of the member 70. The pointer cooperates with a scale 114 located on or inscribed in the number 70. The scale 114 is graduated in degrees of tilt of the support member 81 relative to the upper surface of the table top 18. The particular graduations on the scale 114 are shown by way of example only, it being understood that the scale 114 may be graduated as desired.

A spring 116 has one end connected with the frame 57 and the opposite end connected with the indicator arm 108. The spring 116 serves to constantly bias the indicator arm 108 into engagement with the roller member 107.

The opposite end of the support member 81 is pivotally connected by a bracket 118 with a threaded nut (not shown) that is included in a ball and socket member 120. The nut of the ball and socket member 120 is in threaded engagement with a threaded shaft 122 that extends downwardly to a gear box 124.

The gear box 124 is pivotally connected with the cross member 68 of the frame 57 and includes an operating handle 126 extending therefrom. The handle 126 and gear box 124 are provided to rotate the shaft 122 relative to the threaded nut in the ball and socket member 120 to pivot the support member 81 about the shaft 82.

As may be clearly seen in FIGS. 3 and 4, a saw arbor 128 is mounted on the support member 81 and includes a shaft 130 that is journaled therein. A saw or cutter member 132 is attached to one end of the shaft 130 and a pulley or sheeve 134 is connected with the other end thereof. It will be noted that the saw 132 is partially disposed in the slot 30 in the table top 18. A motor 136 is mounted on the support member 81 relatively below the saw 132. A pulley or sheeve 138 on the motor is interconnected with the shaft 130 by a belt 140.

It can be appreciated that tilting of the support member 81 through the tilting mechanism previously described positions the saw blade 132 at an angle relative to the table top 18 as will be more fully described hereinafter. Also, it will be understood that rotating the handle 126 on the gear box 124 rotates the shaft 122 to raise and lower the saw blade 132 and the support member 81 relative to the table top 18.

The reciprocating mechanism 16 may be most clearly seen in FIG. 4. As shown therein, a handle 142 is removably connected to the upper end of a first lever 144 by a thumb screw 146. The lower end of the first lever 144 is pivotally attached to the cross member 29 and to a vertically disposed guide member 148 that is connected with the end member 20 of the table 12 and the cross member 29.

A dual link 150 (see also FIG. 3) is pivotally connected with the first lever 144 near the medial portion thereof and extends on either side of the guide member 148 into pivotal connection with the medial portion of a second lever 152.

The second lever 152 has its upper end pivotally connected to the inside surface of the end member 20 by a pin and bracket 154. The lower end of the second lever 152 is pivotally connected with a third lever 156 by a pin and bracket 158. As shown most clearly in FIG. 3, the upper end of the third lever 156 is pivotally connected with the end member 58 of the frame 57 by a pin and bracket 160.

As may be seen in FIGS. 1 and 4, the link 150 is provided with a hole 162 extending therethrough. A hole 164 extends through the guide member 148 and is arranged to be aligned with the hole 162 in the link 150 when the first lever 144 is disposed in its closest position to the table 12, as will be described more fully hereinafter. With the first lever 144 in this location, the saw 132 is at its rearmost position in the slot 30, that is, adjacent the end member 22 of the table 12. The holes 162 and 164 are provided so that a pin 166 (see FIG. 1) can be inserted through the aligned holes 162 and 164 to lock the carriage 14 against reciprocation in the table 12.

Figure 6:
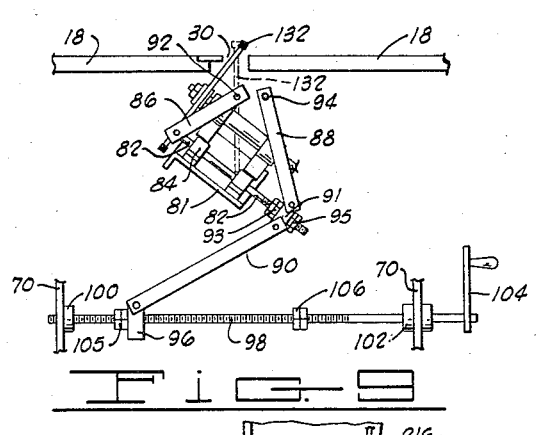
FIG. 6 is an enlarged view illustrating the structure and operation of a fence and clamping mechanism therefor that is utilized with the table saw of FIG. 1.

The fence 48 is utilized when it is desired to make a right angle cut on a piece of wood or the like or when ripping a relatively long board or large panel. As can be seen in FIGS. 1, 2 and 6, the fence 48 includes a vertically disposed elongated member 168 connected with a horizontally disposed member 170.

The fence 48 is clamped to the table 12 at the end thereof adjacent the end member 20 by a short clamping member 172. The member 172 is loosely attached to the horizontally disposed member 170 by a threaded fastener 174 (see FIG. 6). A thumb screw 176 extends through the horizontally disposed member 170 engaging the upper surface of the clamping member 172. Tightening the thumb screw 176 forces the clamping member 172 to pivot about the threaded fastener 174 and into engagement with the underside of the table top 18 as is clearly shown in FIG. 6. To release the fence 48, the thumb screw 176 is loosened, moving out of engagement with the member 172 and thereby permitting the clamping member 172 to become disengaged from the table top 18.

For the convenience of the operator of the table saw 10, the remote end of the fence 48 is clamped to the table 12 by the actuation of the handle 178 that is connected by the pivot pin 179 to the vertically disposed member 168 of the fence 48 relatively near the end member 20 of the table 12. The handle 178 is connected by an elongated rod 180 with a member 182 that is pivotally mounted on the remote end of the elongated member 168. The other end of the member 182 is pivotally attached to a connecting link 184 that is in turn pivotally attached to a clamping member 186. A support member 188 extends downwardly from the elongated member 168 and has its lower end pivotally connected with the clamping member 186.

The arrangement is such that rotation of the handle 178 about the pivot pin 179 from the solid line position illustrated in FIG. 6 to the dash line position illustrated therein moves the rod 180 to rotate the member 182 about its pivotal connection with the elongated member 168. As the member 182 pivots, the link 184 is also pivoted rotating the clamping member 186 out of engagement with the lower surface of the table top 18 as is also shown in dash lines in FIG. 6.

It will be noted in FIG. 6 that the handle 178 engages the upper surface of the horizontally disposed member 170 when the clamping member is in engagement with the lower surface of the table top 18. When in this position, the rod 180 is disposed below the pivot pin 179 connecting the handle 178 with the elongated member 168 so that an "over-the-center" clamping arrangement is provided. Thus, it can be appreciated that the fence 48 can be conveniently clamped to and released from the table top 18 whereby the fence 48 is easily moved to the desired position to serve as a guide for cutting or ripping as previously described.

Figure 7:
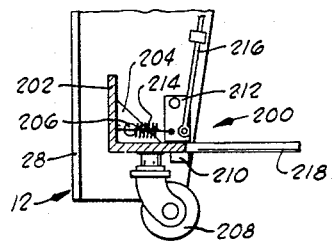
FIG. 7 is an enlarged view partly in cross-section illustrating the structure of a caster mechanism that may be utilized with the table saw of FIG. 1.
Figure 8:
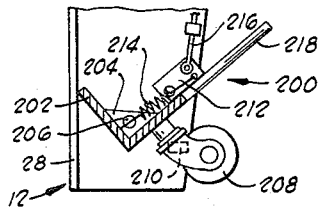
FIG. 8 is a view similar to FIG. 7 but showing the casters in a retracted position.

The enlarged views of FIGS. 7 and 8 illustrate the structure of a caster assembly, generally designated by the reference character 200, that can be utilized with the table saw 10. As shown in FIG. 1, an angle iron member 202 is positioned between adjacent leg members 28 of the table 12 relatively below the end members 20 and 22 thereof. The angle iron members 202 are provided at each end with a gusset 204 (see FIG. 7) each of which is pivotally connected with one of the legs 28 by a pin 206.

A pair of casters 208 (see FIG. 1) are attached to the lower portion of the angle iron member 202 between the legs 28 substantially as shown in FIG. 7. The casters 208 are arranged so that they extend below the lower end of the legs 28 so that the table 12 can be moved thereon as desired.

An abutment 210 is located on each leg 28 relatively below the lower portion of the angle iron member 202 to limit the rotational movement of the angle iron member in a downward direction. A rotatable latch 212 is pivotally attached to one of each set of the legs 28 and is positioned to engage the upper surface of the lower portion of the angle iron member 202 whereby the angle iron member 202 is held in the position illustrated in FIG. 7. The latch 212 is eccentrically shaped and is biased by a spring 214 into the latched position shown in FIG. 7.

A cable 216 is attached to the latch 212, extending upwardly therefrom to a convenient location (not shown) on the table 12. The latch 212 is rotatable out of engagement with the angle iron member 202 to permit retraction of the casters 208 as will be described.

A lever 218 is attached to the angle iron member 202. The lever 218 extends from the member 202 so that it can be engaged by the foot of the operator to rotate the caster assembly 200 into the position shown in FIG. 7.

FIG. 8 illustrates the position of the caster assembly 200 when the table saw 10 is being used to perform a cutting operation. As shown therein, the cable 216 has been pulled, rotating the latch 212 about its pivot and out of latching engagement with the angle iron 202. When the latch 212 is disengaged, the angle iron member 202 pivot about the pin 206, retracting the casters 208, that is, rotating the casters 208 relatively upwardly and away from the supporting surface on which the saw is resting. Retraction of the casters 208 permits the ends of the legs 28 to engage the supporting surface rendering the table saw 10 immobile.

When it is desired to move the table saw 10, the operator steps on the lever 218, rotating the angle iron member 202 to force the casters 208 into engagement with the supporting surface and, thereby, lifting the legs 28. When the angle iron member 202 has been rotated into engagement with the stop member 210, the latch 212 is rotated by the spring 214 into the latching position shown in FIG. 7.

OPERATION

Assuming that the saw 10 is to be utilized in a normal manner, that is, with the board to be cut held stationary on the table top 18 and the saw 132 reciprocated in the slot 30 to perform the cutting operation, the handle 142 is moved toward the table 12. Movement of the handle 142 toward the table 12 rotates the lever 144 about its pivotal connection with the guide member 148 and, through the link 150, forces the second lever 152 to pivot about the pin and bracket 154. As the lever 152 pivots, the lever 156 is pivoted about the pin and bracket 158, forcing the carriage 14 relatively toward the end member 22 of the table 12.

After the board or piece to be cut has been placed on the table top 18, for example, against the mitre guides 40 and 42, the handle 242 is moved relatively away from table 12, as illustrated by the dash lines in FIG. 4, collapsing the levers 152 and 156 to pull the carriage 14 and saw 132 relatively toward the end member 20 of the table 12. As the saw 132 moves toward the end member 20, the work piece held against the mitre gauges 40 and 42 is engaged by the saw 132, thereby performing the desired cutting operation.

It is important to note that the handle 142 is moved in the direction that the saw 132 is to be moved. The operation of the table saw 10 is extremely safe since the handle 142 is pulled relatively away from the table 12 as the cutting action takes place. Thus, there is no danger of the operator's hand slipping from the handle 142 and into the saw blade 132.

If the saw blade 132 does not project through the slot 30 a sufficient distance above the top 18 of the table 12, the operator rotates the handle 126 connected with the gear box 124 to rotate the shaft 122 that, when rotated in the proper direction, moves the threaded nut in the ball and support member 120 and the attached end of the support member 81 upwardly about the shaft 82 to raise the saw blade 132 in the slot 30. The saw blade 132 is lowered by reversing the direction of rotation of the handle 126.

The angular disposition of the blade 132 relative to the table top 18 can be adjusted by rotating the handle 104 in the proper direction. As shown in FIG. 5, the saw blade 132 is at a right angle relative to the table top 18 (shown in dash lines therein).

If it is desired to tilt the saw blade 132 to the position illustrated in FIG. 9, the handle 104 is rotated, rotating the shaft 98 and moving the threaded nut 96 therealong. As the nut 96 moves along the threaded shaft 98, the link 90 is pulled therewith and, through its attachment with the shaft 82, pivots the links 86 and 88 about the pivots 92 and 94, respectively. The particular arrangement of links 86 and 88 with the pivots 92 and 94 is provided so that the tilting of the saw blade 132 occurs about a point located at the surface of table top 18 in the slot 30. The relationship of the saw blade in the vertical position and in the tilted position can be easily seen in FIG. 9 by comparing the solid line saw blade 132 with the dash line saw blade 132 shown therein.

In the preferred form of the invention the stop nuts 105 and 106 are provided to limit the titling or angular disposition of the saw blade 132 from a vertical or zero degree position, as indicated on the scale 114 in FIG. 5A, to a 45 degree angle as shown therein. If desired, the stop nuts 105 and 106 can be located on the shaft 98 so that the saw blade 132 can be positioned at an angle opposite that illustrated in FIG. 9.

The angular position of the saw blade 132 can be determined by the operator by observing the position of the pointer 112 relative to the scale 114. As the handle 104 is rotated, the movement of the roller member 107 downwardly as the link 88 pivots about the pivot 94 moves the indicator arm 108 and the pointer 112 carried thereby downwardly a proportionate distance along the graduations shown on the scale 114, thereby instantaneously indicating the angular position of the saw 132 relative to the surface of the top 18.

If it should be desired to cut a relatively large panel or rip a long board, that is, one that would interfere with the handle 142, the thumb screw 146 can be loosened and the handle 142 removed from the lever 144. The lever 144 is then pivoted toward the table 12 until the holes 162 in the link 150 are coincident with the hole 164 in the guide member 184. After this has been accomplished, the pin 166 is inserted through the holes 162 and 164, locking the saw blade 132 in a position relatively near the end member 22 of the table 12. The mitre guides 40 and 42 are removed to clear the top 18 of the table 12, thereby providing a smooth surface for the large board or panel.

EMBODIMENT OF FIG. 10

FIGS. 10 and 11 illustrate an alternate arrangement of tilting mechanism that may be utilized in the table saw 10. As shown in FIG. 10, the tilting mechanism is in the position it occupies when the saw 132 is in a vertical position in the slot 30 (see FIG. 5). As may be seen by comparing FIGS. 5 and 10, the tilting mechanism illustrated in FIG. 10 includes each of the elements previously described in connection with FIG. 5 with the exception of the bearing 100 supporting one end of the threaded shaft 98.

The shaft 98, in the tilting mechanism of FIG. 10, is mounted in a bearing 250 attached to the member 70. The bearing 250 not only supports the shaft 98 for rotation but permits the pivotal movement of the shaft 98 relative to the member 70.

Pivotally attached to the threaded nut 96 is a fourth tilting lever 252 that has its opposite end pivotally connected with the cross member 72 that forms a portion of the frame 57. The provision of the fourth tilting lever 252 and the bearing 250 permits the pivotal movement of the shaft 98, thereby eliminating the necessity for the bearing 100.

To tilt the saw 132 from the position illustrated in FIG. 10 to the position illustrated in FIG. 11, the handle 104 is rotated to rotate the shaft 98 in the threaded nut 96. As the shaft 98 rotates, the threaded nut 96 moves relatively toward the stop nut 105 that is mounted on the shaft 98. As the nut 96 moves along the threaded shaft 98, the shaft 98 pivots in the bearing 250, pivoting the tilting links 86 and 88 about the pivots 92 and 94, and swinging the shaft 82 relatively downwardly until the links 86 and 88 reach the position illustrated in FIG. 11. The tilting link 90, which is connected at one end with the shaft 82 and at the other end with the shaft 98 through the nut 96, pivots downwardly as does the fourth tilting link 252. The tilting links 90 and 252 function to stabilize the outer end of the shaft 98 as it pivots in the bearing 250.

To return the blade 132 to the vertical position as illustrated in FIG. 10, the handle 104 is rotated in the opposite direction, rotating the interconnected shaft 98 in the opposite direction also. As the shaft 98 rotates in the opposite direction, the threaded nut 96 moves relatively toward the stop nut 106, forcing the link 90, the attached shaft 82, and the tilting link 88 to rotate generally about the pivot 94 in an upwardly, that is, in a counter-clockwise direction. Also, as the nut 96 moves relatively toward the stop nut 106, the fourth tilting link 252 pivots about its connection with the cross member 72 in a clockwise direction swinging the outer end of the shaft 98 relatively upwardly. The rotation of handle 104 is continued until the threaded nut 96 engages the stop nut 106 or until the saw blade 132 assumes the vertical position illustrated in FIG. 10.

As may be seen by comparing FIGS. 5 and 10, the tilting mechanism illustrated in FIG. 10 eliminates the necessity for the bearing 100 and provides for a substantial reduction in length of the shaft 98. Thus, the shaft 98 is more rigid. The fourth tilting link 252, working in conjunction with the shaft 98, provides an increased mechanical advantage over the tilting mechanism shown in FIG. 5 and, therefore, provides a tilting mechanism that is somewhat easier to operate and that provides better control of the angular position of the saw blade 132.

From the foregoing detailed description of the table saw 10, it can be seen that the saw 10 is very versatile in that it may be used for cutting large panels or boards, ripping long boards, cutting mitre-joints, or forming the ends of the board at a vertical angle relative to the table top 18. Also, it can be appreciated that the unique design of the table saw 10 permits its manufacture by well known production procedures to reduce the cost of the saw and, yet, provides a saw that is extremely accurate.

It will be understood that the embodiments described hereinbefore are presented by way of example only and that many changes and modifications can be made thereto without departing from the spirit of the invention or from the scope of the annexed claims.

What I claim is:
1. A table saw comprising:
   a table including
      a horizontally disposed top member having an elongated slot therein,
      a pair of end members disposed in parallel, spaced relationship below and connected with said top member, and a pair of side members disposed in parallel, spaced relationship below said top and connected with said end members and top member, said side members each having an elongated inwardly facing guide surface and an upwardly facing guide surface thereon;

a reciprocating carriage including a frame, a first set of roller members mounted on said frame for rotation about vertical axes and in engagement with the inwardly facing guide surfaces on said side members, a second set of roller members mounted on said frame for rotation about horizontal axes and in engagement with the upwardly facing guide surfaces on said side members, said roller members and guide surfaces cooperating to mount said carriage for reciprocating movement in said table parallel to said slot, a support member pivotally connected with said frame, a cutter member rotatably mounted on said support member and having a portion thereof disposed in said slot, driving means mounted on said support member and operably connected with said cutter member, and adjusting means mounted on said frame and connected with said support member to pivot said support member relative to said frame; and reciprocating means including an elongated guide member having an upper end connected with one of said end members, a first lever having a lower end pivotally connected with the lower end of said guide member, a second lever having an upper end pivotally connected with said one end member, a link having one end pivotally connected with a medial portion of said first lever and the other end pivotally connected with a medial portion of said second lever, said link cooperating with said guide means to aid in limiting said first and second levers to pivotal movement in a vertical plane, and a third lever having an upper end pivotally connected with said frame and a lower end pivotally connected with said second lever, whereby pivotal movement of said first lever causes an amplified pivotal movement of said third lever to reciprocate said carriage in said table a greater distance than the movement of said first lever.

2. The saw of claim 1 wherein said adjusting means includes:

a threaded nut mounted in said support member and pivotal relative thereto;

an elongated threaded member having an upper end operably engaging said threaded nut and a lower end pivotally connected with said frame relatively below said support member; and, actuating means operably connected with said threaded member for rotating said threaded member relative to said nut to pivot said support member relative to said frame, thereby raising and lowering said cutter member relative to said top member.

3. The saw of claim 1 wherein said adjusting means includes:

a first tilting lever having one end pivotally connected with said frame and the other end pivotally connected with said support member;

a second tilting lever having one end pivotally connected with said frame and the other end pivotally connected with said support member;

a third tilting lever having one end pivotally connected with said support member adjacent the pivotal connection between said second tilting lever and said support member; and, actuating means operably connected with the other end of said third tilting lever for moving said tilting levers to pivot said support member relative to said frame, whereby said cutting member is tilted in said slot at an angle relative to said top member.

4. The saw of claim 3 and also including a tilt indicating arm having one end pivotally connected with said frame and having a pointer on the other end thereof;

means projecting from the pivotal connection between said third tilting lever and support member engaging said tilt indicating arm to move said arm in proportion to the angle of tilt of said support member; and indicating means calibrated in degrees of tilt of said cutter member located on said frame adjacent said pointer, whereby said pointer indicates the angle of said cutter member relative to said top member.

5. The saw of claim 3 wherein said actuating means includes an elongated threaded shaft journaled in said frame; and, wherein said third tilting lever includes a pivotally mounted threaded nut operably engaging said threaded shaft, whereby rotation of said threaded member moves said tilting lever therealong to tilt said support member and cutter member.

6. A table saw comprising:

a table including a horizontally disposed top member having an elongated slot therein, a pair of end members disposed in parallel, spaced relationship below and connected with said top member, and a pair of side members disposed in parallel, spaced relationship below said top and connected with said end members and top member, said side members each having an elongated inwardly facing guide surface and an upwardly facing guide surface thereon;

a reciprocating carriage including a frame, a first set of roller members mounted on said frame for rotation about vertical axes and in engagement with the inwardly facing guide surfaces on said side members, a second set of roller members mounted on said frame for rotation about horizontal axes and in engagement with the upwardly facing guide surfaces on said side members, said roller members and guide surfaces cooperating to mount said carriage for reciprocating movement in said table parallel to said slot, a support member pivotally connected with said frame, a cutter member rotatably mounted on said support member and having a portion thereof disposed in said slot, driving means mounted on said support member and operably connected with said cutter means, a threaded nut mounted in said support member and pivotal relative thereto, an elongated, threaded member having an upper end operably engaging said threaded nut and a lower end pivotally connected with said frame relatively below said support member, actuating means operably connected with said threaded member for rotating said threaded member to pivot said support member relative to said frame, thereby raising and lowering said cutter member relative to said top member, a first tilting lever having one end pivotally connected with said frame and the other end pivotally connected with said support member,
a second tilting lever having one end pivotally connected with said frame and the other end pivotally connected with said support member,
a third tilting lever having one end pivotally connected with said support member adjacent the pivot connection of said second tilting lever with said support member,
second actuating means operably connected with the other end of said third tilting lever for moving said tilting levers to pivot said support member relative to said frame, whereby said cutting member is tilted in said slot at an angle relative to said top member,
a tilt indicating arm having one end pivotally connected with said frame and having a pointer on the other end thereof,
means projecting from the pivotal connection between said third tilting lever and upper member engaging said tilt indicating arm to move said arm in proportion to the angle of tilt of said support member, and
indicating means calibrated in degrees of tilt of said cutter member located on said frame adjacent said pointer, whereby said pointer indicates the tilt angle of said cutter member relative to said top member; and,
reciprocating means including
an elongated guide member having an upper end connected with one of said end members,
a first lever having a lower end pivotally connected with the lower end of said guide member,
a second lever having an upper end pivotally connected with said one end member,
a link having one end pivotally connected with a medial portion of said first lever and the other end pivotally connected with a medial portion of said second lever, said link cooperating with said guide means to aid in limiting said first and second levers to pivotal movement in a vertical plane, and
a third lever having an upper end pivotally connected with said frame and a lower end pivotally connected with said second lever, whereby pivotal movement of said first lever causes an amplified pivotal movement of said third lever to reciprocate said carriage in said table a greater distance than the movement of said first lever.

7. The table saw of claim 6 wherein said second actuating means includes:
a threaded shaft having each end journaled in said frame;
an operating handle connected with one end of said shaft;
a threaded nut threadedly engaged with said shaft and pivotally connected with said third tilting lever; and,
a pair of spaced lock nuts positioned on said threaded shaft on each side of said threaded nut for engaging said threaded nut to limit the movement of said threaded nut on said shaft and the angular position of said cutting member relative to said top member.

8. The table saw of claim 6 wherein said second actuating means includes:
a threaded shaft having one end mounted for rotation and pivotal movement in said frame;
an operating handle connected with the end of said shaft;
a threaded nut threadedly engaging said shaft and pivotally connected with said third tilting lever;
a fourth tilting lever having one end pivotally connected with said threaded nut and having the other end pivotally connected with said frame; and,
a pair of spaced lock nuts threadedly engaging said threaded shaft and arranged to engage said threaded nut to limit the movement of said threaded nut on said shaft and the angular position of said cutting member relative to said top member.

9. In a table saw including a table having a slotted top member, a pair of parallely disposed end members, and a pair of parallely disposed side members; a carriage mounted for reciprocation in the table and carrying a rotatable cutter member partially disposed in the slot, the improvement comprising:
an elongated guide member having an upper end connected with one of said end members;
a first lever having a lower end pivotally connected with the lower end of said guide member;
a second lever having an upper end pivotally connected with said one end member;
a link having one end pivotally connected with a medial portion of said first lever and the other end pivotally connected with a medial portion of said second lever, said link cooperating with said guide means to aid in limiting said first and second levers to pivotal movement in a vertical plane; and,
a third lever having an upper end pivotally connected with said frame and a lower end pivotally connected with said second lever, whereby pivotal movement of said first lever causes an amplified pivotal movement of said third lever to reciprocate said carriage in said table a greater distance than the movement of said first lever.

10. In the table saw of claim 9 wherein said guide member has a hole extending therethrough and said link has a hole extending therethrough arranged to be aligned with the hole in said guide member; and also including pin means insertable in said aligned holes to prevent movement of said link relative to said guide member, thereby preventing reciprocation of said carriage.

11. In the table saw of claim 10 wherein said first lever includes a handle removably connected with the upper end thereof, the upper end of said first lever being relatively below the surface of said top member when said handle is removed therefrom.

References Cited

UNITED STATES PATENTS

| | | | |
|---|---|---|---|
| 2,323,247 | 6/1943 | Sellmeyer | 143—6.47 |
| 2,703,115 | 3/1955 | Beagle | 143—47.5 XR |
| 3,013,592 | 12/1961 | Ambrosio et al. | 143—36 |
| 3,128,801 | 4/1964 | Brede | 143—47 |
| 3,280,861 | 10/1966 | Gierde | 143—36 XR |

WILLIAM W. DYER, JR., *Primary Examiner.*

W. D. BRAY, *Assistant Examiner.*